United States Patent
Ito

(10) Patent No.: US 10,969,626 B2
(45) Date of Patent: Apr. 6, 2021

(54) OPTICAL MEMBER FOR BACKLIGHT DEVICE AND LIQUID CRYSTAL DISPLAY DEVICE USING THE SAME

(71) Applicant: FUNAI ELECTRIC CO., LTD., Osaka (JP)

(72) Inventor: Tatsuya Ito, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 16/809,563

(22) Filed: Mar. 5, 2020

(65) Prior Publication Data

US 2020/0285115 A1 Sep. 10, 2020

(30) Foreign Application Priority Data

Mar. 8, 2019 (JP) .............................. JP2019-042812

(51) Int. Cl.
| | | |
|---|---|---|
| G02F 1/13357 | (2006.01) | |
| B60K 37/02 | (2006.01) | |
| F21V 8/00 | (2006.01) | |
| B60Q 3/10 | (2017.01) | |

(52) U.S. Cl.
CPC ........ *G02F 1/133606* (2013.01); *B60K 37/02* (2013.01); *G02B 6/0043* (2013.01); *G02F 1/133605* (2013.01); *B60K 2370/1523* (2019.05); *B60Q 3/10* (2017.02)

(58) Field of Classification Search
CPC .................. G02B 6/0043; F21V 11/08–14
See application file for complete search history.

(56) References Cited

U.S. PATENT DOCUMENTS

| | | | | |
|---|---|---|---|---|
| 2009/0003002 A1* | 1/2009 | Sato | ..................... | G02B 6/0043 362/341 |
| 2010/0296021 A1* | 11/2010 | Jung | .................... | G02B 6/0088 349/58 |
| 2010/0328570 A1* | 12/2010 | Kim | ..................... | G02B 6/0088 349/58 |
| 2012/0013811 A1* | 1/2012 | Shimizu | ............... | G02B 6/0021 348/739 |

(Continued)

FOREIGN PATENT DOCUMENTS

JP 2012242649 12/2012

*Primary Examiner* — Evan P Dzierzynski
*Assistant Examiner* — Keith G. Delahoussaye
(74) *Attorney, Agent, or Firm* — JCIPRNET

(57) ABSTRACT

A liquid crystal display device with high visibility and a backlight device for implementing the liquid crystal display device are provided. A backlight device (100) for irradiating light to a back surface of a liquid crystal panel (19) in a liquid crystal display device 101 includes: light sources (45); a substrate (51); and a plate-like optical member (29) through which a part of light emitted by the light sources (45) is transmitted. The optical member (29) includes: first region (A11) and two or more second regions (A21), wherein in the first region (A11), the light transmittance increases as separating from a mounting position of one light source (45), and in the second regions (A21), the light transmittance increases as approaching an outer peripheral portion from a central portion of the optical member (29) in a predetermined direction in places in contact with another adjacent second region (A21).

16 Claims, 12 Drawing Sheets

(a)

(b)

(c)

(d)

(56) References Cited

U.S. PATENT DOCUMENTS

| | | | |
|---|---|---|---|
| 2012/0218752 A1* | 8/2012 | Sumitani | G02F 1/133605 |
| | | | 362/235 |
| 2013/0114252 A1* | 5/2013 | Lo | F21V 11/14 |
| | | | 362/235 |
| 2013/0201663 A1* | 8/2013 | Cho | G02F 1/133608 |
| | | | 362/97.2 |
| 2015/0261042 A1 | 9/2015 | Sugaya | |
| 2016/0091760 A1* | 3/2016 | Ogura | G02F 1/133605 |
| | | | 349/69 |
| 2017/0184917 A1* | 6/2017 | Yi | G02F 1/133603 |
| 2019/0113808 A1* | 4/2019 | Isono | F21S 2/00 |
| 2019/0227221 A1* | 7/2019 | Yasunaga | G02B 6/0051 |
| 2019/0243172 A1* | 8/2019 | Gotou | G02F 1/133608 |
| 2019/0271884 A1* | 9/2019 | Watanabe | G02F 1/133602 |
| 2020/0218004 A1* | 7/2020 | Yoon | G02F 1/1336 |

* cited by examiner (a) comparison example (b) implementation example

OPTICAL MEMBER FOR BACKLIGHT DEVICE AND LIQUID CRYSTAL DISPLAY DEVICE USING THE SAME

CROSS-REFERENCE TO RELATED APPLICATION

This application claims the priority benefit of Japan application serial No. 2019-042812, filed on Mar. 8, 2019. The entirety of the above-mentioned patent application is hereby incorporated by reference herein and made a part of this specification.

BACKGROUND OF THE DISCLOSURE

Technical Field

The disclosure relates to a backlight device for irradiating light on a back surface of a liquid crystal panel and a liquid crystal display device including the backlight device.

Related Art

In recent years, opportunities for using a liquid crystal display device have increased, and a liquid crystal display device with higher efficiency and higher performance have been devised. For example, in patent literature 1, an optical sheet is disclosed which can reduce luminance unevenness and uniformly control luminance distribution of the entire screen of a liquid crystal display device by appropriately arranging a geometric structure with high light-condensation and a substantially hemispherical lens with high diffusivity.

LITERATURE OF RELATED ART

Patent Literature

[Paten literature 1] Japanese Patent Laid-open No. 2012-242649

Meanwhile, one of performance indexes of a liquid crystal display device that needs improvement most is the level of visibility by a user. However, in the optical sheet disclosed in patent literature 1, the luminance unevenness cannot be sufficiently reduced. In addition, in the conventional liquid crystal display device, there are limitations such as a limitation on light sources to be used because of high efficiency and the like, and it is difficult to achieve a liquid crystal display device having high visibility.

The disclosure provides a liquid crystal display device with high visibility and a backlight device for achieving the liquid crystal display device.

SUMMARY

A backlight device according to one aspect of the disclosure is a backlight device for irradiating light to a back surface of a liquid crystal panel in a liquid crystal display device, and includes: a plurality of light sources; a substrate on which the plurality of light sources is mounted on a surface; and a plate-like optical member which is disposed to face the surface of the substrate and through which a part of light emitted by the plurality of light sources is transmitted, wherein the optical member includes: first regions corresponding to one light source among the plurality of light sources; and two or more second regions which are different from the first regions and have an arrangement outline formed by combining two or more light sources adjacent to each other in a first direction among the plurality of light sources, wherein in the first regions, the light transmittance increases as separating from a mounting position of the one light source, and in one second region among the two or more second regions, in places in contact with another second region adjacent in a second direction different from the first direction, the light transmittance increases as approaching an outer peripheral portion from a central portion of the optical member in a predetermined direction intersecting the second direction.

According to this, in the first regions of the optical member in which the light from the light sources is incident as direct light, the transmittance based on distances from the light sources can be set, and in the second regions in which light which is substantially uniform by multiple reflection is incident, the transmittance can be set based on the outline of the set second regions. Therefore, the light transmitted through the optical member becomes uniform light directly above and near the light sources. In addition, in regions away from the light sources, the light transmitted through the optical member becomes light with high luminance in the outer peripheral portion of the optical member and becomes uniform light in other central portion and the like. That is, the backlight device with uniform luminance can be implemented which takes absorption in the outer peripheral portion into consideration. Thus, a liquid crystal display device with high visibility can be implemented by the backlight device having uniform luminance even in the outer peripheral portion (that is, an end portion).

For example, each of the plurality of light sources may be configured by a plurality of light emitting elements which is integrally driven for each light source, and in places where distances from the light sources or the light emitting elements are the same, it may be determined that the light transmittance in corresponding third regions between adjacent light emitting elements within the first regions are smaller than the light transmittance in the second regions.

Accordingly, power saving of the backlight device can be implemented by split driving, and the backlight device which has uniform luminance taking the absorption in the outer peripheral portion into consideration can be implemented. Thus, the liquid crystal display device with high visibility can be implemented by the backlight device having uniform luminance even in the outer peripheral portion.

In addition, the backlight device may further include a housing which houses the plurality of light sources and the substrate and has an opening at a place facing the surface of the substrate, wherein a step portion to which the outer peripheral portion of the optical member is attached may be arranged in the opening of the housing, and a step portion reflection surface which reflects the light may be formed on at least a part of a surface of the step portion.

Accordingly, the light absorbed in the step portion arranged for attaching the optical member to the housing can be reduced, and the backlight device can be implemented which has uniform luminance by reducing the absorption in the outer peripheral portion. Thus, the liquid crystal display device with high visibility can be implemented by the backlight device having uniform luminance even in the outer peripheral portion.

In addition, the backlight device may further include a fixing member being frame-shaped and configured to be in contact with the housing and fix the outer peripheral portion of the optical member to the step portion, wherein a fixing member reflection surface which reflects the light may be formed on at least a part of the surface of the fixing member to which the optical member is fixed.

Accordingly, the light absorbed in the fixing member for fixing the optical member can be reduced, and the backlight device can be implemented which has uniform luminance by reducing the absorption in the outer peripheral portion. Thus, the liquid crystal display device with high visibility can be implemented by the backlight device having uniform luminance even in the outer peripheral portion.

In addition, the backlight device may further include a diffusion plate for diffusing the light transmitted through the optical member, wherein the diffusion plate has an inclined surface which is formed on at least a part of an outer peripheral portion of the diffusion plate, and a diameter of the inclined surface increases from a side of an incident surface of the diffusion plate where the light is incident from the optical member toward a side of an emission surface opposite to the incident surface.

Accordingly, the light absorbed in the outer peripheral portion of the diffusion plate can be reflected toward the emission surface, and the backlight device can be implemented which has uniform luminance by raising the luminance in the outer peripheral portion. Thus, the liquid crystal display device with high visibility can be implemented by the backlight device having uniform luminance even in the outer peripheral portion.

In addition, the inclined surface may be formed into a convex surface.

Accordingly, the light absorbed in the outer peripheral portion of the diffusion plate can be condensed and reflected toward the emission surface, and the backlight device can be implemented which has uniform luminance by raising the luminance in the outer peripheral portion. Thus, the liquid crystal display device with high visibility can be implemented by the backlight device having uniform luminance even in the outer peripheral portion.

In addition, the backlight device may further include a reflection member which has a reflection surface inclined along the inclined surface of the diffusion plate.

Accordingly, the light absorbed in the outer peripheral portion of the diffusion plate can be efficiently reflected toward the emission surface, and the backlight device can be implemented which has uniform luminance by raising the luminance in the outer peripheral portion. Thus, the liquid crystal display device with high visibility can be implemented by the backlight device having uniform luminance even in the outer peripheral portion.

In addition, an optical unit including the optical member and the diffusion plate may have a polygonal shape in a plan view in which at least a part of each corner of the optical unit is formed into a notch-shaped structure, and the step portion may have a protruding structure corresponding to the notch-shaped structure formed at least at a part of each corner of the optical unit.

Accordingly, the light absorbed in the corners where the light is remarkably attenuated can be reduced, and the backlight device can be implemented which has uniform luminance by reducing the absorption in the outer peripheral portion. Thus, the liquid crystal display device with high visibility can be implemented by the backlight device having uniform luminance even in the outer peripheral portion.

In addition, a plurality of transmission portions through which the light is transmitted may be formed in the first regions and the second regions of the optical member, and the light transmittance increases as the area of each of the transmission portions increases.

Accordingly, the above transmittance distribution can be implemented by the transmission portions through which the light is transmitted, furthermore, the backlight device which has uniform luminance taking the absorption in the outer peripheral portion into consideration can be implemented by changing the area of the transmission portion from the central portion to the outer peripheral portion. Thus, the liquid crystal display device with high visibility can be implemented by the backlight device having uniform luminance even in the outer peripheral portion.

In addition, the transmission portions may be through holes penetrating the optical member in a direction perpendicular to a main surface of the optical member.

Accordingly, the through holes may be arranged in a reflection plate surface as the transmission portions, and furthermore, the areas of the through holes in a plan view (that is, sizes of the holes) may be changed from the central portion to the outer peripheral portion. A simple and highly reliable backlight device with uniform luminance can be implemented. Thus, the liquid crystal display device with high visibility can be implemented by the backlight device having uniform luminance even in the outer peripheral portion.

In addition, a liquid crystal display device according to one aspect of the disclosure includes the liquid crystal panel and the backlight device according to any one of the above for irradiating the light to the back surface of the liquid crystal panel.

Accordingly, the light whose uniform luminance is maintained even in the outer peripheral portion is irradiated on the back surface of the liquid crystal panel. Thus, uniform display is possible even in the outer peripheral portion, and the liquid crystal display device with high visibility can be implemented.

DESCRIPTION OF THE EMBODIMENTS

Background of the Invention

Various measures have been taken to improve visibility of a user in a liquid crystal display device. In particular, improvement in luminance uniformity has been attempted as a measure for a backlight device which irradiates light on a liquid crystal panel from a back surface.

However, it is difficult to strictly maintain luminance uniformity over the entire screen. Therefore, in an existing liquid crystal television or the like, a luminance decrease which gradually changes from a center of the screen toward end portions (outer peripheral portion) is allowed within a range where display quality is not significantly impaired.

On the other hand, as a moving body such as an automobile becomes more and more electronic, there is an increasing number of cases in which a liquid crystal monitor is mounted to a cluster. Information necessary for driving the moving body is displayed on the liquid crystal monitor mounted to the cluster, and thus the entire screen must be reliably visible. Thus, a decrease in luminance at the end portions including corners is not preferable. That is, in the backlight device, luminance uniformity over the entire screen is strictly required.

Furthermore, in the moving body such as an automobile or the like, the liquid crystal display device must be arranged in a limited space and must be accommodated in a minimum housing size necessary for the display screen. That is, it is difficult to newly incorporate another device for making the luminance uniform.

The disclosure is completed in view of the above situation, and an object of the disclosure is to provide a backlight device which can irradiate light with more uniform luminance, and a liquid crystal display device with higher visibility which is implemented by the backlight device.

According to the disclosure, the liquid crystal display device with high visibility and the backlight device for implementing the liquid crystal display device can be provided.

Hereinafter, embodiments of the disclosure are described in detail with reference to the drawings. Besides, each of the embodiments described below shows a comprehensive or specific example. Numerical values, shapes, materials, components, arrangement positions and connection forms of the components, and the like shown in the following embodiments are merely examples and are not intended to limit the disclosure. In addition, components not described in the independent claims within the components in the following embodiments are described as arbitrary components. In each drawing, each dimension, each dimension ratio or the like is not necessarily shown in a precise manner.

In addition, in each drawing, an X-axis direction, a Y-axis direction, and a Z-axis direction which are orthogonal to each other are appropriately used for description. Particularly, a plus side in the Z-axis direction may be described as an upper side and a minus side may be described as a lower side.

Embodiment 1

Figure 1:
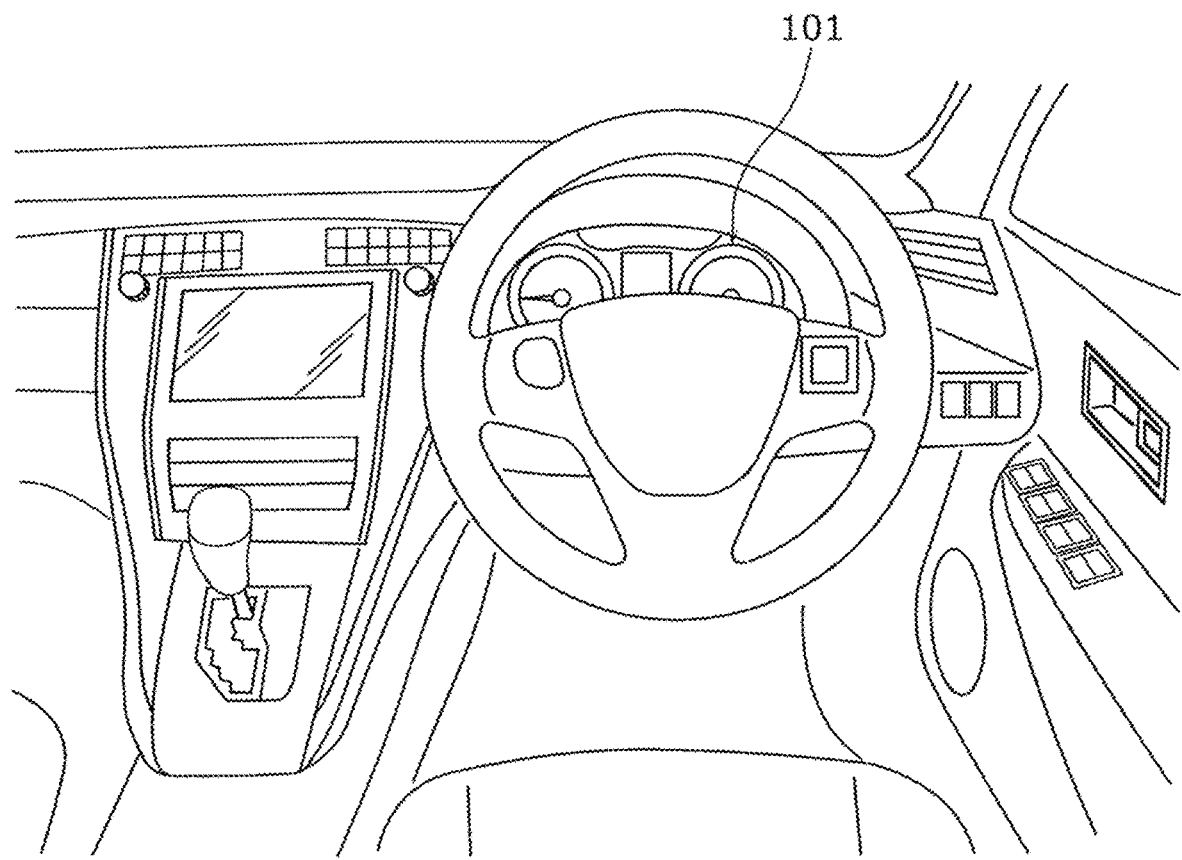
FIG. 1 is a diagram for illustrating an example of use of a liquid crystal display device according to Embodiment 1.

First, a liquid crystal display device according to Embodiment 1 is described using FIG. 1. FIG. 1 is a diagram for illustrating an example of use of the liquid crystal display device according to Embodiment 1. FIG. 1 is a diagram showing an example in which a liquid crystal display device 101 is used in an instrument panel of a moving body. As shown in FIG. 1, the liquid crystal display device 101 is used for a cluster of the moving body such as a vehicle or the like as an example, and displays information relating to the moving body such as a speed, an oil temperature, a remaining fuel amount, a travel distance and the like on a display surface.

Moreover, the liquid crystal display device 101 may be additionally used as a liquid crystal display of a television, a computer, a smartphone, a tablet terminal, or the like. The liquid crystal display device 101 needs to have high visibility from a driver of the moving body. In addition, since an amount of the information to be displayed on the liquid crystal display device 101 is increasing, the liquid crystal display device 101 is required to have display performance which can be used even in end portions of the display surface. In order to use the liquid crystal display device 101 even in the end portions of the display surface, it is necessary that a luminance equivalent to the luminance at a central portion of the display surface is maintained even at the end portions.

The luminance of the liquid crystal display device 101 is determined by a backlight device for irradiating light on a back surface of a liquid crystal panel. The luminance of the liquid crystal display device 101 determined by the backlight device is described together with a configuration of the backlight device in this embodiment with reference to FIG. 2.

Figure 2:
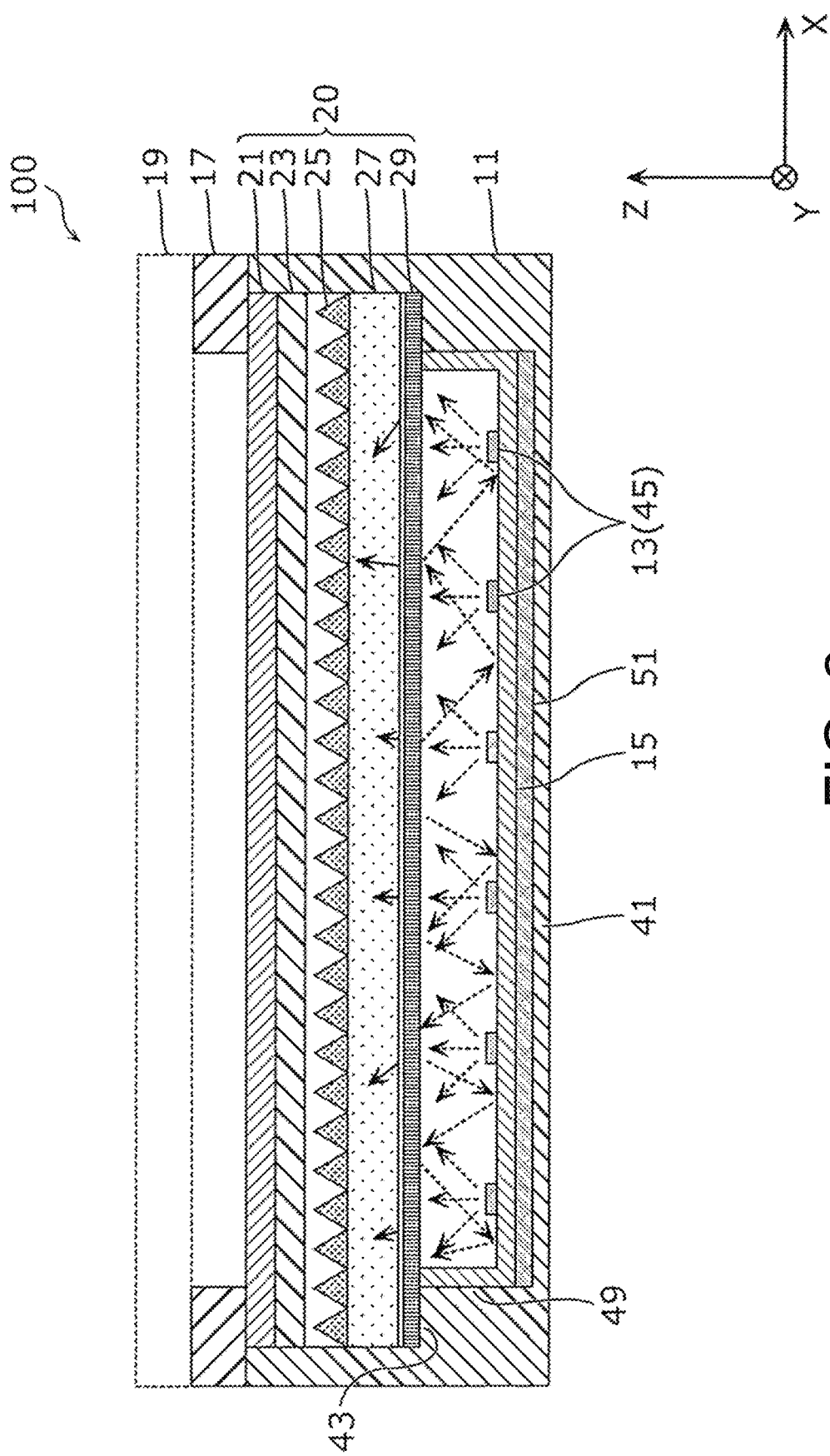
FIG. 2 is a cross-sectional view of a backlight device according to Embodiment 1.

FIG. 2 is a cross-sectional view of the backlight device according to Embodiment 1. FIG. 2 shows a backlight device 100 configuring the liquid crystal display device 101 by being disposed along a liquid crystal panel 19 on a back surface side of the liquid crystal panel 19. Moreover, the cross section of FIG. 2 is a cross section obtained by cutting the backlight device 100 along a surface orthogonal to a display surface of the liquid crystal panel 19. In FIG. 2, the liquid crystal panel 19 is shown as a broken-line rectangle at a position where the liquid crystal panel 19 can be disposed.

As shown in FIG. 2, the backlight device 100 includes a plurality of light sources 45, a housing 11, an optical unit 20, and a fixing member 17.

The light sources 45 are light emitting devices for emitting light to the back surface of the liquid crystal panel 19. The light sources 45 are two-dimensionally mounted on a surface of a plate-like substrate 51. That is, the plurality of light sources 45 is mounted on the surface of the substrate 51 so as to be separated in a row direction and a column direction. In the embodiment, each light source 45 is configured by a single light emitting element 13.

The light emitting elements 13 are implemented by chip LEDs (Light Emitting Diode) mounted on the substrate 51. The light emitting elements 13 emit light having a predetermined orientation angle with respect to the surface of the substrate 51. In addition, the light emitting elements 13 are electrically connected to the outside with a wiring pattern printed on the substrate 51. The light emitting elements 13 are connected to a control device by, for example, a flat cable extending from the substrate 51 to the outside, and are driven in units of the light sources 45 by the control device.

As the substrate 51 on which the light emitting elements 13 are mounted, a printed substrate made of an arbitrary material such as a substrate 51 using glass and epoxy as main components are used. Moreover, the substrate 51 may be divided into a plurality of parts. For example, the substrate 51 may be implemented by a substrate unit configured by arranging, in the column direction, strip-shaped unit substrates which take the row direction as a longitudinal direction.

In addition, a region of the surface of the substrate 51 where the plurality of light sources 45 is not mounted is covered with a reflection sheet 15. By being covered with the reflection sheet, a reflection surface is formed in the region. The reflection sheet 15 may be, for example, a diffuse reflection sheet such as foamed polyethylene terephthalate or the like. A plurality of holes for respectively exposing the plurality of light sources 45 is formed in the reflection sheet 15. Moreover, the reflection sheet 15 is not limited to this, and may be, for example, a regular reflection film such as an aluminum vapor deposition film in which aluminum is vapor deposited on a resin film.

The substrate 51 in which the light emitting elements 13 serving as the light sources 45 are mounted on the surface and the surface is covered with the reflection sheet 15 as described above is housed in the housing 11. The housing 11 is a casing which houses the light sources 45 and the substrate 51. In addition, the housing 11 has an opening at a place facing the surface of the substrate 51, and the light emitted from the light sources 45 is emitted from the opening.

Here, the housing 11 includes a bottom portion 41 in which the substrate 51 is housed and a step portion 43 arranged in the opening. The bottom portion 41 of the housing 11 has a shape substantially the same as the shape of the substrate 51. Thereby, when the substrate 51 is housed, the substrate 51 is disposed over substantially the entire region of the bottom portion 41 of the housing 11. That is, the light sources 45 can irradiate substantially the entire region of the opening of the housing 11.

With this structure, the housing 11 can house the substrate 51 in the bottom portion 41 and attach an outer peripheral portion of the optical unit 20 to the step portion 43. Thus, the opening of the housing 11 is defined by the shape and size corresponding to the bottom portion 41. The reflection sheet 15 described above is disposed on a wall portion 49 which connects the bottom portion 41 and the step portion 43 of the housing 11.

The reflection sheet 15 which is disposed on the wall portion 49 rising from the outer peripheral portion of the bottom portion 41 of the housing 11 toward the opening has an integral structure connected to the reflection sheet 15 which covers the surface of the substrate 51. In this way, a space surrounded by the optical unit 20 and the reflection sheet 15 is formed inside the housing 11. The optical unit 20 transmits a part of the light emitted from the light source 45 and reflects the other part, and the details are described later. Accordingly, the light reflected by the optical unit 20 propagates while being repeatedly reflected inside the space. Since the reflection sheet 15 has an integral structure, there is little leakage of the reflected light, and light utilization efficiency is increased.

The optical unit 20 is a plate-like structure in which an optical member 29, a diffusion plate 27, a prism sheet 25, a polarizing sheet 23, and a louver sheet 21 are laminated in this order.

Moreover, the plate shape is a concept including not only a relatively thick shape but also a sheet shape having a relatively small thickness. In addition, the transmission means that the light reaches another surface of a member from one surface of the member, and is a concept including not only the light being guided through a transparent member but also the light passing through holes and reaching another surface from one surface.

The louver sheet 21 is a so-called peep prevention sheet. Therefore, the louver sheet 21 suppresses light irradiation to a wide angle side exceeding a predetermined angle with respect to the back surface of the liquid crystal panel 19. Thereby, the light which becomes noises can be suppressed from being emitted in an unnecessary direction.

The polarizing sheet 23 is a polarizing filter which transmits only polarized light in a predetermined direction and reflects polarized light in other directions among the light emitted from the light sources 45.

Although a polarizing plate is included in the liquid crystal panel 19, the polarizing plate is a configuration which absorbs light other than the polarized light in the predetermined direction, and the light utilization efficiency is reduced by an amount of the light absorbed. Therefore, a reflection polarizing filter is arranged as the polarizing sheet 23 on the backlight device 100 side, and polarizing components in an absorption axis direction of the polarizing plate included in the liquid crystal panel 19 is temporarily returned to the housing 11 side for recycling, and thereby the light utilization efficiency can be improved.

The prism sheet 25 is a light-condensing member which improves luminance by narrowing an orientation angle of the light emitted from the light sources 45. By including the prism sheet 25, the luminance of the light emitted from the backlight device 100 can be improved without increasing an amount of the light emitted from the light sources 45.

The diffusion plate 27 emits substantially uniform light (light which is nearly uniform) by diffusing the light emitted from the light sources 45. The diffusion plate 27 is made of, for example, a resin in which fine particles are dispersed. The diffusion plate 27 adjusts the light emitted from the backlight device 100 to substantially uniform luminance at every place of the emission surface by making the light substantially uniform.

The optical member 29 is a plate-like structure which transmits a part of the light emitted from the light sources 45 and reflects the other part. In the embodiment, the plurality of light sources 45 are two-dimensionally arranged to be separated from each other. That is, places with a relatively high luminance (high-luminance regions) are formed directly above and near the light sources 45, and places with a low luminance (low-luminance regions) are formed between two adjacent light sources 45 and between the light sources 45 and the wall portion 49 of the housing 11. That is, uneven luminance is generated.

The optical member 29 is configured in a manner that the transmittance is low in regions corresponding to the high-luminance regions, and the transmittance is high in regions corresponding to the low-luminance regions. Accordingly, when light with such uneven luminance is incident, the optical member 29 reflects most of the light in the regions corresponding to the high-luminance regions, and transmits most of the light in the regions corresponding to the low-luminance regions. In this way, the optical member 29 has different light transmittances at different places on the plate surface. With the difference in transmittance, the optical member 29 makes the luminance unevenness caused by the arrangement of the light sources 45 substantially uniform. That is, the optical member 29 is a so-called luminance uniforming member. The optical member 29 will be described more specifically later.

The fixing member 17 is a member which is in contact with the opening end of the housing 11 and fixes the outer peripheral portion of the optical member 29 to the step portion 43. Since the fixing member 17 is disposed along the outer peripheral portion of the optical member 29 and the opening of the housing 11, the fixing member 17 is formed in a frame shape corresponding to the outer peripheral portion and the opening. The fixing member 17 is fixed to the housing 11, thereby pressing the outer peripheral portion of the optical unit 20 downward and fixing the outer peripheral portion of the optical member 29 to the step portion 43.

Figure 3:
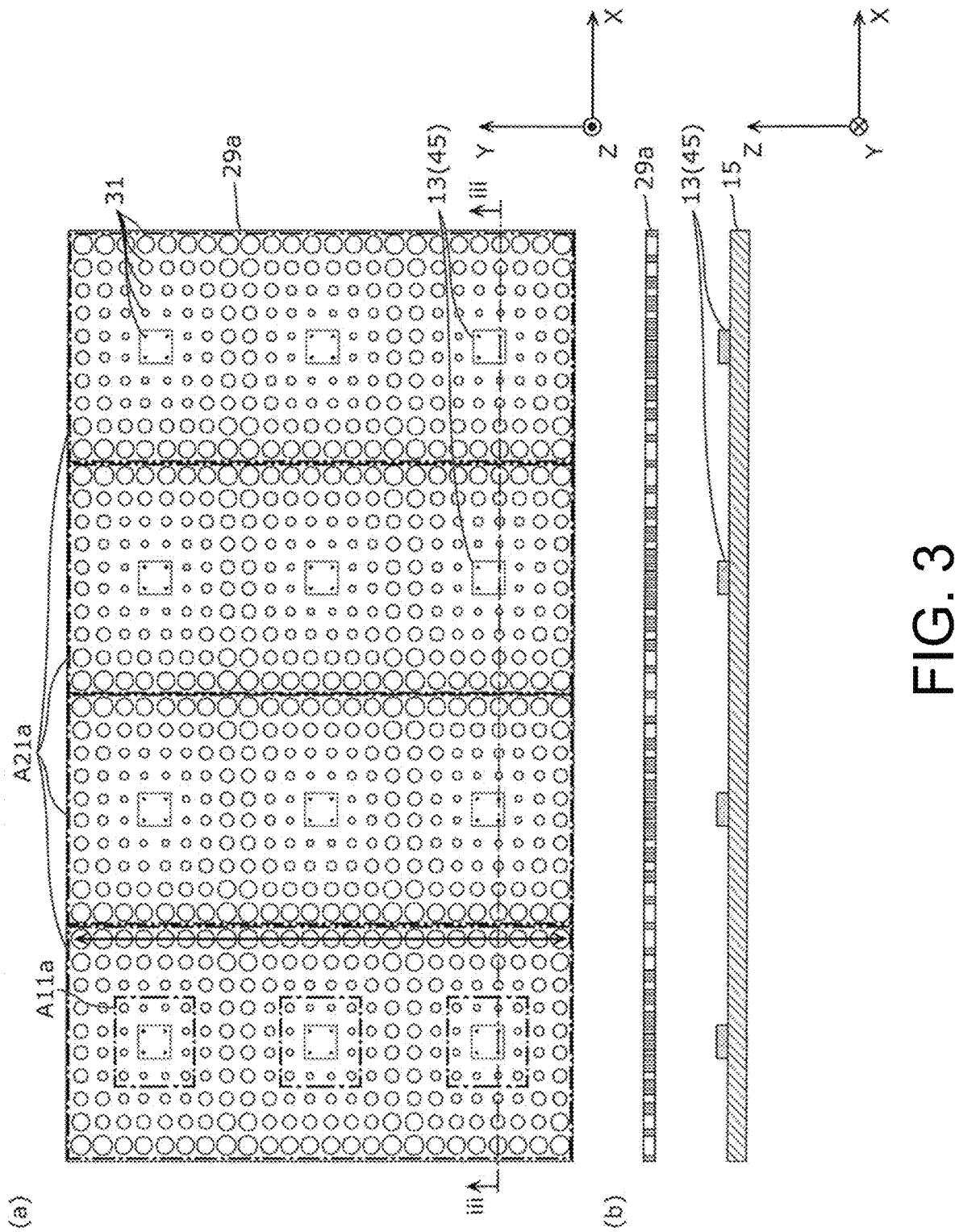
FIG. 3 is a diagram for illustrating a configuration of an optical member in a conventional backlight device.

The optical member 29 is described below in more detail using FIG. 3. FIG. 3 is a diagram for illustrating a configuration of an optical member in a conventional backlight device.

(a) of FIG. 3 is a plan view of a plate surface of a conventional optical member 29a. In addition, (b) of FIG. 3 shows a cross-sectional view in which the optical member 29a is cut in a cross section iii-iii shown in (a) of FIG. 3. Moreover, in (b) of FIG. 3, the light sources 45 and the substrate 51 covered with the reflection sheet 15 are shown together with the optical member 29a.

As shown in FIG. 3, in the optical member 29a, transmission portions through which light is transmitted is formed by through holes 31 which penetrates a plate surface in a vertical direction. In addition, the light transmittance is determined by the hole diameter (that is, area) of the through hole 31. That is, the larger the hole diameter is, the more the light that can be transmitted and the higher the transmittance is. On the other hand, the smaller the hole diameter is, the less the light that can be transmitted and the lower the transmittance is. In the conventional optical member 29a, the through holes 31 at positions closest to the light sources 45 (that is, directly above the light sources 45) have the smallest hole diameter, and the hole diameter of the through hole 31 increases as the through hole 31 gets away from the light sources 45. A plurality of the light sources 45 is mounted on the backlight device 100. Places where the transmittance is the highest (that is, the light emitted from the light sources 45 is least incident) are positions where distances from each light source 45 are equal. In addition, similarly, since the outer peripheral portion of the optical member 29a is also a place with a high transmittance because of the far distance from each light source 45. Accordingly, the places having the highest transmittance are uniformly arranged on the optical member 29a, and the light transmitted through the optical member 29a is adjusted to a uniform luminance.

Here, the outer peripheral portion of the optical unit 20 including the optical member 29a is fixed to the step portion 43 described above. In this configuration, inside the optical unit 20, the light emitted from the light sources 45 is transmitted and emitted from an emission surface. However, since each member configuring the optical unit 20 has transparency and reflectivity, the light spreads in in-plane directions within the optical unit 20. The light spreading in the in-plane directions is irradiated toward the housing 11 when reaching the outer peripheral portion. Since the housing 11 does not have reflectivity, light attenuation due to absorption occurs in the outer peripheral portion of the optical unit 20. Due to the attenuation, the luminance is significantly reduced in the outer peripheral portion (including the corners) of the optical unit 20.

In order to cope with the light attenuation, it is necessary to set the luminance in the outer peripheral portion higher than the luminance at the central portion when the light is transmitted through the optical member 29a.

Figure 4:
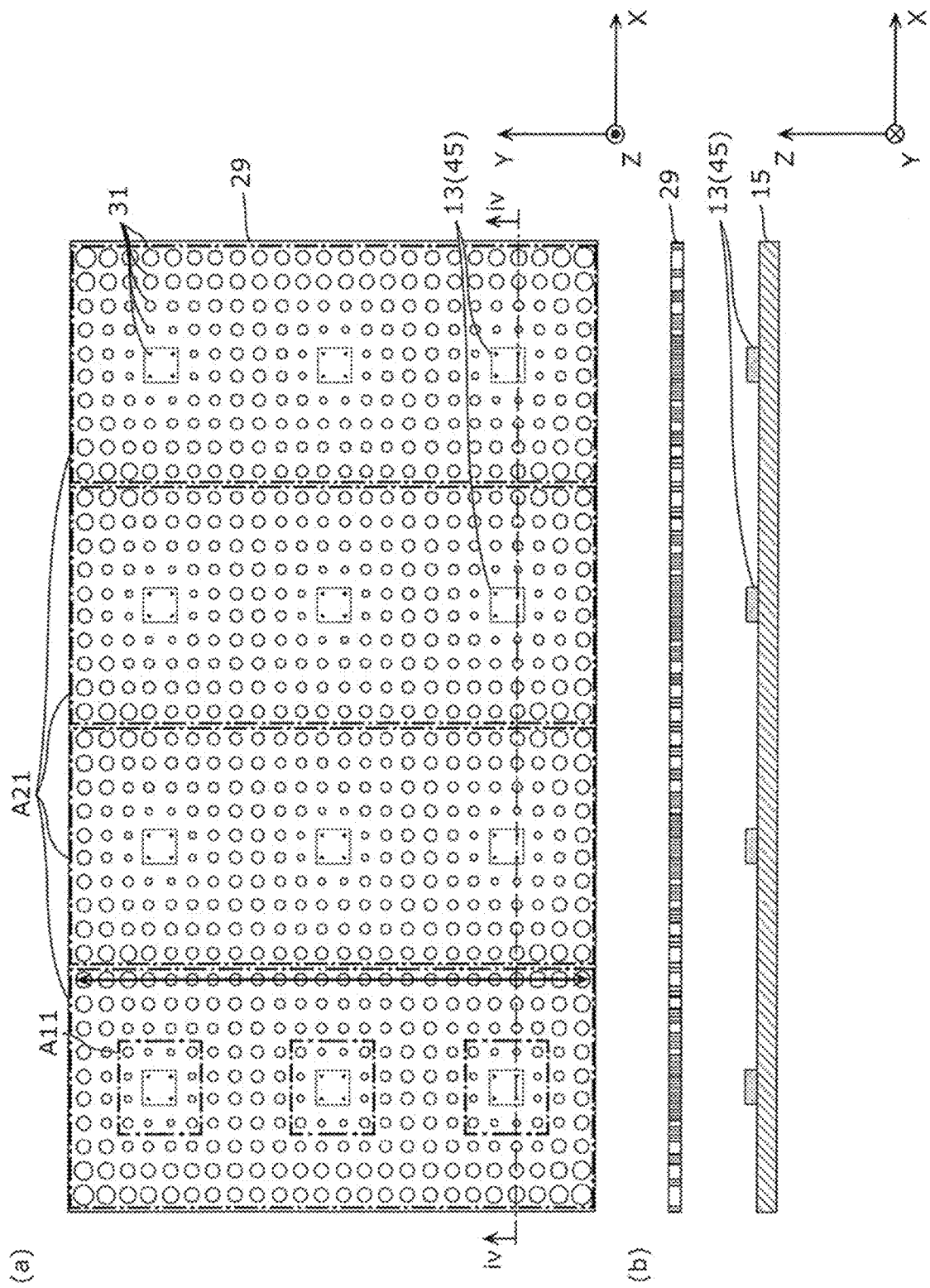
FIG. 4 is a diagram for illustrating a configuration of an optical member of the backlight device according to Embodiment 1.

FIG. 4 is a diagram for illustrating a configuration of the optical member of the backlight device according to Embodiment 1. FIG. 4 is a view showing the optical member 29 in the embodiment from the same viewpoint as FIG. 3. (a) of FIG. 4 is a plan view of the plate surface of the optical member 29 of the embodiment. (b) of FIG. 4 shows a cross-sectional view in which the optical member 29 is cut in a iv-iv cross section shown in (a) of FIG. 4. Moreover, (b) of FIG. 4 shows the optical member 29, the light sources 45 and the substrate 51 covered with the reflection sheet 15. As shown in FIG. 4, in the embodiment, the hole diameters of the through holes 31 in the outer peripheral portion of the optical member 29 are larger than the hole diameters in the central portion, and the hole diameters of the through holes 31 in the corner portions are the largest. That is, the transmittances are set to increase in an order of positions where light attenuation due to absorption is significant.

Here, in first regions A11 corresponding to respective light sources 45, since a large amount of the light emitted from the light source 45 is incident as direct light, it is determined that the transmittance increases as separating from the mounting position of the light source 45. This may be considered substantially the same for first regions A11a in the conventional optical member 29a. On the other hand, in the embodiment, light incident on second regions A21 which are regions other than the first regions A11 is the light which is emitted from the light sources 45 and which becomes more uniform in luminance after being repeatedly reflected by the optical unit 20 and the reflection sheet 15.

Therefore, the light incident on the second regions A21 needs to be corrected by the amount of the light absorbed by the housing 11 at the outer peripheral portion. As shown in (a) of FIG. 4 as an example, arrangement outlines of the light sources 45 in the second regions A21 are considered which are formed by combining three light sources 45 adjacent to each other in the Y-axis direction (a first direction) among the plurality of light sources 45. Due to the arrangement of the light sources 45, the second region A21 forms a rectangular outline which is long in the Y-axis direction. The rectangle corresponds to a region across the entire region of the optical member 29 in the Y-axis direction and across a part of the optical member 29 in the X-axis direction. In addition, a plurality of the second regions A21 is arranged adjacently over the entire region of the optical member 29. Specifically, as shown in FIG. 4, four second regions A21 formed by combining three light sources 45 are arranged adjacently along the X-axis direction (a second direction).

Here, when the substantially uniform light is seen with respect to one second region A21 among the plurality of second regions A21, in a place which is indicated by arrows in the drawing and which is in contact with another adjacent second region A21, from the central portion of the optical member 29 in the Y-axis direction (a predetermined direction) intersecting the second direction to the outer peripheral portion, the luminance decreases due to light attenuation caused by the absorption of the housing 11 after the light is transmitted through the optical member 29. That is, it is determined that in one second region A21, in the place in contact with another adjacent second region A21, the light transmittance in the optical member 29 increases as approaching the outer peripheral portion from the central portion of the optical member 29 in the Y-axis direction. In other words, in one second region A21, in the place in contact with another adjacent second region A21, a place showing a transmittance higher than the transmittance of the outer peripheral portion of the optical member 29 does not exist in the other places from the central portion to the outer peripheral portion. Moreover, the above change in the transmittance which increases as approaching the outer peripheral portion from the central portion has an average tendency, and there may be local unevenness in transmittance. It is sufficient that the transmittance at the outer peripheral portion is maximum and there is no other places where the transmittance is equal to or higher than the transmittance of the outer peripheral portion.

Thereby, in the first regions A11 where the direct light from the light sources 45 is dominant, the transmitted light is made uniform according to an amount of the light propagating from the light sources 45. On the other hand, in the second regions A21 where the substantially uniform light propagating from the light sources 45 through multiple reflections is dominant, more light is transmitted in the outer peripheral portion than in the central portion according to the arrangement outline. The amount of the light transmitted in the outer peripheral portion corresponds to an amount of the light absorbed by the housing 11 in the outer peripheral portion.

Thus, the backlight device 100 with uniform luminance which takes the absorption in the outer peripheral portion into consideration can be implemented. Thus, the liquid crystal display device 101 with high visibility can be implemented by the backlight device 100 having uniform luminance even in the outer peripheral portion.

In (a) of FIG. 4, the second region A21 includes the entire region of the optical member 29 in the Y-axis direction. Therefore, the distribution of the hole diameters of the through holes 31 in the Y-axis direction (an example of the predetermined direction) indicated by an arrow in the drawing may be set in a manner that the hole diameter increases as approaching the outer peripheral portion from the central portion of the optical member 29.

On the other hand, in (a) of FIG. 3, although the transmittance at the outer peripheral portion is the maximum in the place which is indicated by arrows in the drawing and where one second region A21a is in contact with another adjacent second region A21a, there is a plurality of places showing equivalent transmittance. Specifically, the transmittance is the maximum at a plurality of places where distances from the plurality of light sources 45 are the longest and direct light arriving from the light sources 45 is the least. In this configuration, after the light transmitted through the optical member 29a becomes substantially uniform, a part of the light is absorbed by the housing 11 in the outer peripheral portion. That is, when the light is emitted from the backlight device, the luminance is reduced in the outer peripheral portion.

Embodiment 2

Figure 5:
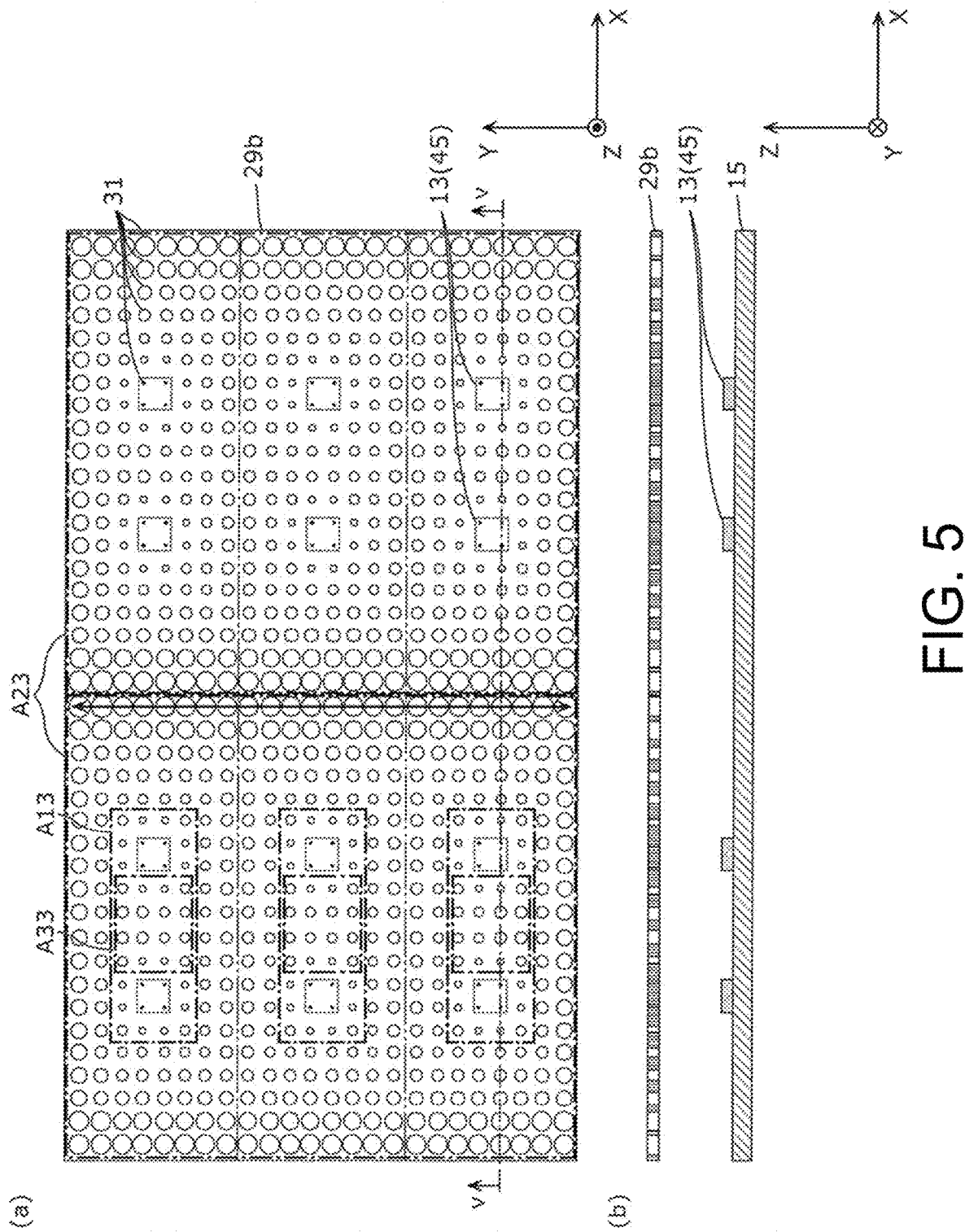
FIG. 5 is a diagram for illustrating a configuration of an optical member of a backlight device according to Embodiment 2.

Next, Embodiment 2 is described with reference to FIG. 4 and FIG. 5. FIG. 5 is a diagram for illustrating a configuration of an optical member of a backlight device according to Embodiment 2. FIG. 5 is a diagram showing an optical member 29b in the embodiment from the same viewpoint as FIG. 4. (a) of FIG. 5 is a plan view of a plate surface of the optical member 29b of this embodiment. In addition, (b) of FIG. 5 shows a cross-sectional view in which the optical member 29b is cut in a v-v cross section shown in (a) of FIG. 5.

In the embodiment, a configuration of light sources 45 is different from that of the Embodiment 1 described above. More specifically, each of the light sources 45 is configured by a plurality of light emitting elements 13 which is integrally driven for each light source 45. In the embodiment, as an example, an example in which one light source 45 is configured by two light emitting elements 13 is described. A backlight device 100 in the embodiment is used in, for example, a liquid crystal display device 101 which can perform split driving (local dimming). By performing the split driving, each of the light sources 45 can be individually turned on/off. That is, control of only turning on the light sources 45 at necessary places and turning off the other light sources 45 is performed. Accordingly, since only the light sources 45 at the necessary places are turned on, energy efficiency is good.

As shown in FIG. 5, two light emitting elements 13 of the light sources 45 are arranged close to each other in the X-axis direction. That is, the arrangement of the light emitting elements 13 is not uniform when viewed as a whole. When the non-uniform arrangement of the light emitting elements 13 is performed, a transmittance distribution of the optical member 29b determined by the through holes 31 is also non-uniform. Thus, in the embodiment, a Y-axis direction (an example of the predetermined direction) is used in which the light sources 45 are arranged at least uniformly.

Arrangement outlines of the light sources 45 in second regions A23 are considered which are formed by combining three light sources 45 adjacent to each other in the Y-axis direction among the plurality of light sources 45 shown in FIG. 5. Due to the arrangement of the light sources 45, the second region A23 forms a rectangular outline which is long in the Y-axis direction. The rectangle corresponds to a region across the entire region of the optical member 29b in the Y-axis direction. In addition, a plurality of second regions A23 is arranged adjacently over the entire region of the optical member 29b. Specifically, as shown in FIG. 5, two second regions A23 formed by combining three light sources 45 each including two light emitting elements 13 are arranged adjacently along the X-axis direction (the second direction).

The optical member 29b is determined in a manner that in one second region A23, in a place which is in contact with another adjacent second region A23, the light transmittance in the optical member 29b increase at least as approaching an outer peripheral portion from a central portion in the Y-axis direction (one example of the predetermined direction) indicated by the arrow in the diagram. Thereby, in the second regions A23, more light is transmitted in the outer peripheral portion than in the central portion according to the arrangement outline.

In addition, here, the light emitting elements 13 adjacent in first regions A13 corresponding to the light sources 45 are separated from each other. Through holes 31 are also arranged in regions of the optical member 29b corresponding to the separation. The regions on the optical member 29b corresponding to the separation are third regions A33. In the second regions A23 or the third regions A33, in places of which distances from the light sources 45 or the light emitting elements 13 are the same, the transmittance in the third region A33 is determined to be smaller than the transmittance in the second regions A23. Thereby, the luminance of the light transmitted through the optical member 29b can be adjusted uniformly between the adjacent light sources 45 and in other regions.

With the above configuration, the backlight device 100 in the embodiment can implement the backlight device 100 with uniform luminance in consideration of absorption in the outer peripheral portion even when the light emitting elements are non-uniformly arranged. Thus, the liquid crystal display device 101 with high visibility can be implemented by the backlight device 100 having uniform luminance even in the outer peripheral portion.

Embodiment 3

Figure 6:
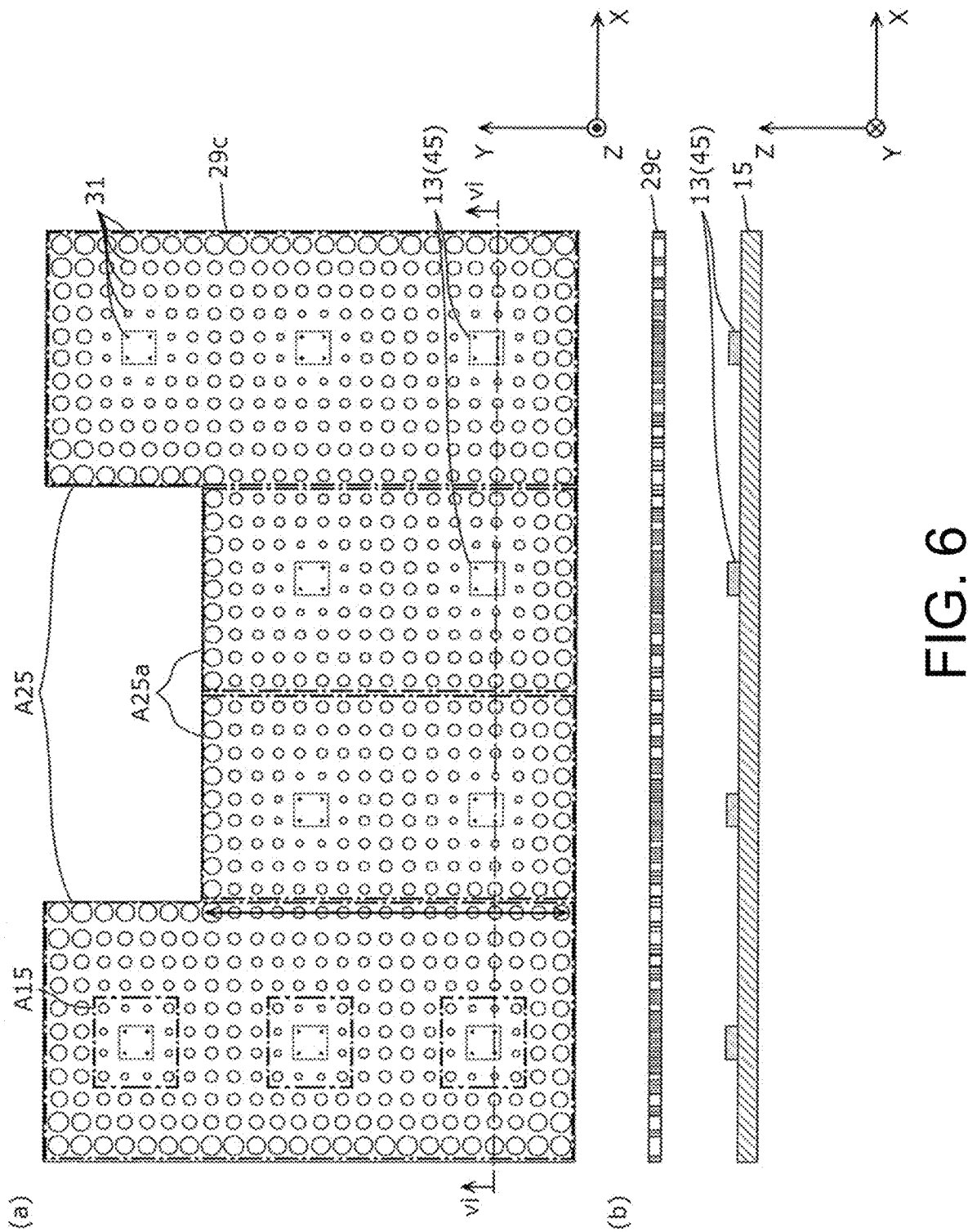
FIG. 6 is a diagram for illustrating a configuration of an optical member of a backlight device according to Embodiment 3.

Next, Embodiment 3 is described using FIG. 4 and FIG. 6. FIG. 6 is a diagram for illustrating a configuration of an optical member of a backlight device according to Embodiment 3. FIG. 6 is a diagram showing an optical member 29c in the embodiment from the same viewpoint as FIG. 4. (a) of FIG. 6 is a plan view of a plate surface of the optical member 29c of the embodiment. In addition, (b) of FIG. 6 shows a cross-sectional view in which the optical member 29c is cut in a vi-vi cross section shown in (a) of FIG. 6.

In the embodiment, the shape of the optical member 29c is different from the shape of the first embodiment described above. More specifically, in Embodiment 1, the example in which the backlight device 100 is a simple rectangle is described. In contrast, in the embodiment, a case will be described in which the backlight device 100 has a complicated shape which is recessed in the in-plane direction. For example, when the liquid crystal display device 101 is mounted on an instrument panel of a vehicle or the like, it is desirable that the liquid crystal display device 101 has a flexible shape adaptability from the viewpoint of design.

In first regions A15 corresponding to respective light sources 45, similarly to Embodiment 1, a large amount of the light emitted from the light sources 45 is incident as direct light, and thus it is determined that the transmittance increases as separating from mounting positions of the light sources 45.

On the other hand, as shown in FIG. 6, the optical member 29c in the embodiment has, according to the shape of the backlight device 100, regions where the light sources 45 are uniformly arranged (two at the minus side in the Y-axis direction in (a) of FIG. 6×four in the X-axis direction=eight) and regions where the light sources 45 are non-uniform (discontinuous). Thus, in the embodiment, the Y-axis direction (an example of the predetermined direction) is used in which the light sources 45 are arranged at least uniformly.

The arrangement outline of the light sources 45 in second regions A25 are considered which are formed by combining three light sources 45 adjacent to each other in the Y-axis direction among the plurality of light sources 45 shown in FIG. 6. Due to the arrangement of the light sources 45, the second region A25 forms a rectangular outline which is long in the Y-axis direction. The rectangle shows a region over the entire region of the optical member 29c in the Y-axis direction. In addition, a plurality of second regions A25 and A25a is arranged adjacently over the entire region of the optical member 29c. Specifically, as shown in FIG. 6, two second regions A25 formed by combining three light sources 45 and two second regions A25a formed by combining two light sources 45 are arranged adjacently along the X-axis direction (the second direction). More specifically, the second region A25, the second region A25a, the second region A25a, and the second region A25 are arranged adjacently in this order.

In the optical member 29c, only the two light sources 45 on the minus side in the Y-axis direction are in an arrangement region where the light sources 45 are uniform. That is, the optical member 29c is determined in a manner that in one second region A25, in a place which is in contact with another adjacent second region A25a, the light transmittance in the optical member 29c increases at least as approaching an outer peripheral portion from a central portion, the central portion being in a part of the Y-axis direction (one example of the predetermined direction) which is indicated by an arrow in the diagram and corresponding to the arrangement region of the uniform light sources 45. Thereby, in the second regions A25, more light is transmitted in the outer peripheral portion than in the central portion according to the arrangement outline.

Moreover, even when the arrow in the diagram is extended to an arrangement region of non-uniform light sources 45 on the plus side of the Y axis direction, corners of the outer peripheral portion need to have the highest transmittance, and thus the light transmittance of the optical member 29c increases as approaching the outer peripheral portion from the central portion. That is, in one second region A25, the light transmittance of the optical member 29c increases as approaching the outer peripheral portion from the central portion in the Y-axis direction, including places which are not in contact with another adjacent second region A25a. However, the light transmittance of the optical member 29c changes rapidly at a boundary between the arrangement region of the uniform light sources 45 and the arrangement region of the non-uniform light sources 45.

With the above configuration, the backlight device 100 in the embodiment can implement the backlight device 100 with uniform luminance in consideration of absorption in the outer peripheral portion even when the backlight device 100 has a complicated shape. Thus, the liquid crystal display device 101 with high visibility can be implemented by the backlight device 100 having uniform luminance even in the outer peripheral portion.

Embodiment 4

Figure 7:
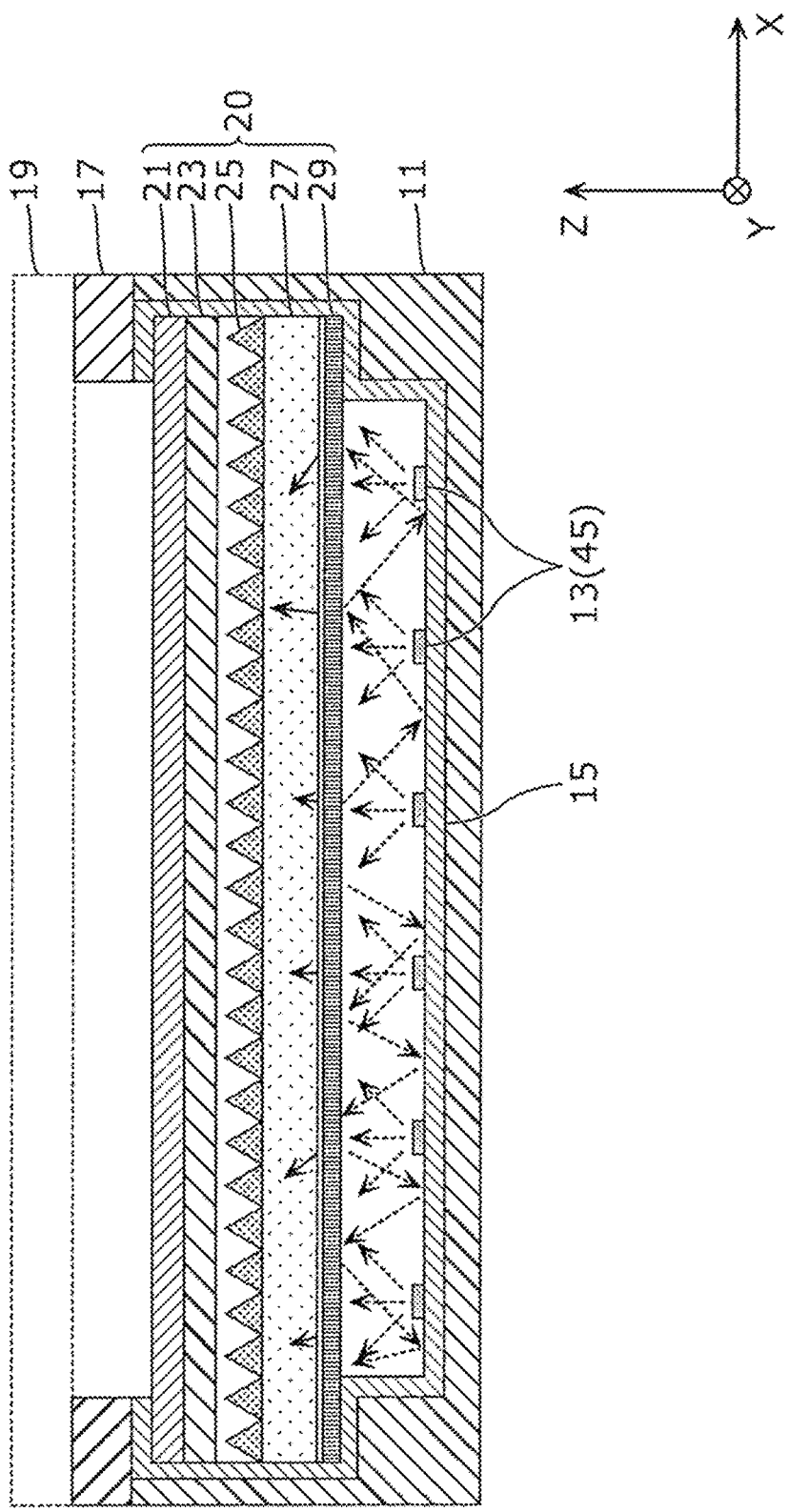
FIG. 7 is a cross-sectional view of a backlight device according to embodiment 4.

Next, Embodiment 4 is described using FIG. 7. FIG. 7 is a cross-sectional view of a backlight device according to Embodiment 4. FIG. 7 shows a cross-sectional view in which the backlight device 100 according to the embodiment is cut in the same cross section as FIG. 2. Compared with the Embodiment 1 (see FIG. 2) described above, the backlight device 100 according to the embodiment differs in a configuration of the reflection sheet 15. Therefore, hereinafter, description will focus on the reflection sheet 15, and description of the configuration substantially the same as the configuration described above will be omitted or simplified.

The backlight device 100 according to the embodiment can cope with a case in which light attenuation at the outer peripheral portion is remarkable and the luminance cannot be made substantially uniform when there is only the optical member 29. The backlight device 100 according to the embodiment includes the reflection sheet 15 on a surface on the Z-axis minus side of the step portion 43 and a surface in the X-axis direction (that is, a surface facing a side end of the optical unit 20). In addition, the reflection sheet 15 is similarly included on a surface of the fixing member 17 in contact with the optical unit 20.

Thereby, since the outer peripheral portion of the optical unit 20 is covered with the reflection sheet 15, light attenuation in the outer peripheral portion can be significantly suppressed. Therefore, absorption at the outer peripheral portion is suppressed, and the backlight device 100 with uniform luminance can be implemented. Thus, the liquid crystal display device 101 with high visibility can be implemented by the backlight device 100 having uniform luminance even in the outer peripheral portion.

Moreover, when the light attenuation occurs only in a part of the outer peripheral portion due to arrangement characteristics of light sources 45 or the like, the reflection sheet 15 (e.g., the step portion reflection surface and/or the fixing member reflection surface) may be included only on the surface of the step portion 43 and/or the fixing member 17 corresponding to the place of this part. Moreover, the reflection sheet 15 may be integrally formed, or may be substantially integrated by pasting individual sheets. The same applies to the reflection sheet 15 which covers the substrate 51 and the wall portion 49.

Embodiment 5

Figure 8:
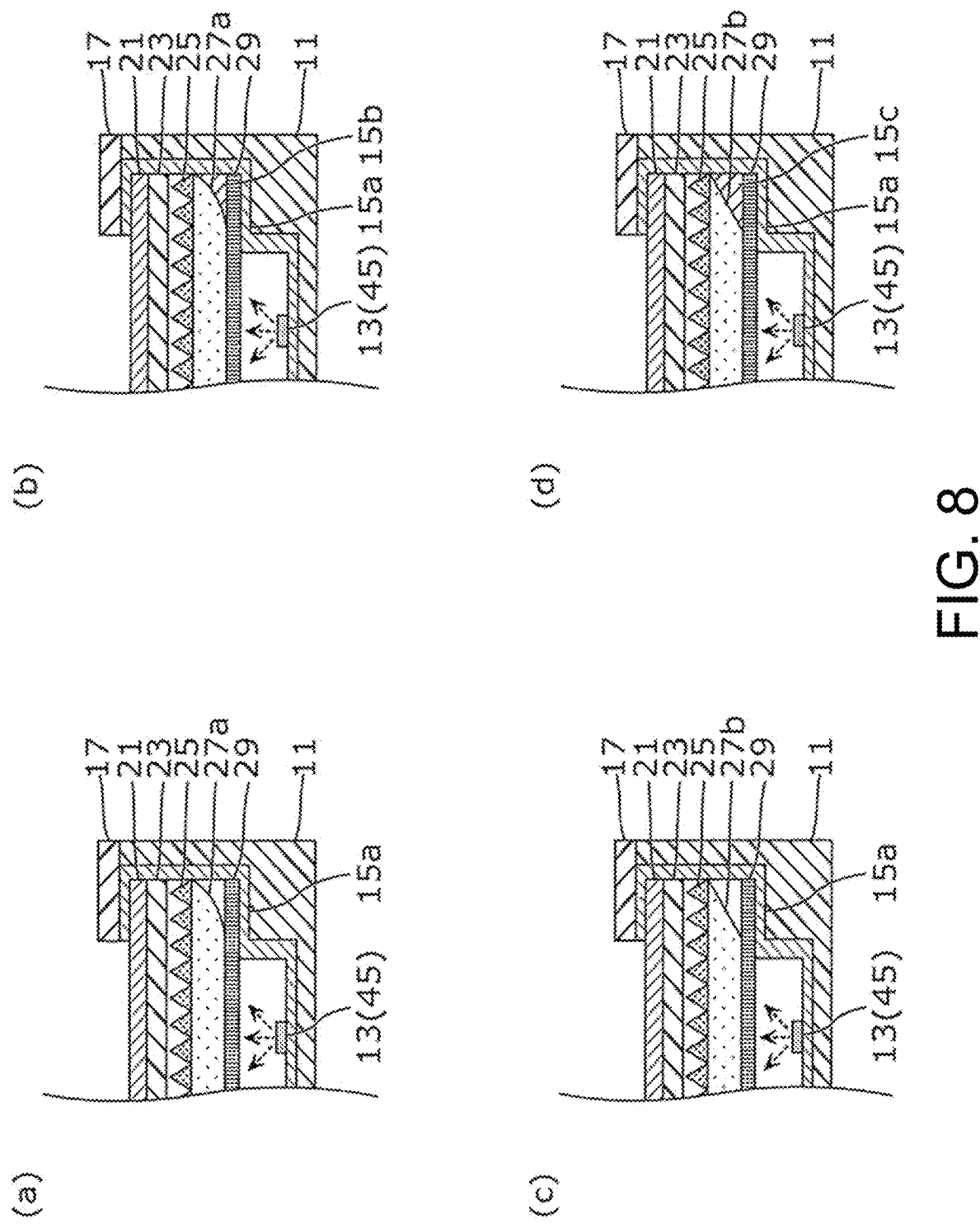
FIG. 8 is a cross-sectional view of a backlight device according to embodiment 5.

Next, Embodiment 5 is described using FIG. 8. FIG. 8 is a cross-sectional view of a backlight device according to Embodiment 5. FIG. 8 shows a cross section similar to FIG. 7, and illustration on the minus side in the X-axis direction is omitted. (a) of FIG. 8 shows a first example of Embodiment 5. In addition, (b) of FIG. 8 shows a second example of Embodiment 5. In addition, (c) of FIG. 8 shows a third example of Embodiment 5. In addition, (d) of FIG. 8 shows a fourth example of Embodiment 5.

In the embodiment, in addition to the backlight device 100 described in Embodiment 4, the configuration of the optical unit 20 is different. More specifically, the configuration of the outer peripheral portion of the diffusion plate 27 in the optical unit 20 is different.

For example, the light traveling in the X-axis direction through the diffusion plate 27 is only reflected in the X-axis direction and is not emitted from an emission surface even if the reflection sheet 15 as described in Embodiment 4 is included. On the other hand, in diffusion plates 27a and 27b in the embodiment, the light traveling in the X-axis direction through the diffusion plate 27 is reflected at the outer peripheral portion and travels toward the outer peripheral portion of the emission surface.

As shown in (a) of FIG. 8, in the first example of the embodiment, an inclined surface is formed on at least a part of the outer peripheral portion of the diffusion plate 27a, and a diameter of the inclined surface increases from an incident surface side where the light is incident from the optical member 29 of the diffusion plate 27a toward an emission surface side opposite to the incident surface side. In addition, the inclined surface is formed into a convex surface. Thereby, the light reflected by the inclined surface is irradiated to the outer peripheral portion of the emission surface.

In addition, as shown in (b) of FIG. 8, the second example of the embodiment has a reflection surface having a shape along the inclined surface in addition to the configuration of the diffusion plate 27a shown in the first example. The second example is configured by a reflection member having the reflection surface. For example, the reflection member is configured to support the reflection sheet attached to the inclined surface by filling with a resin or the like. Moreover, the reflection mode may be diffuse reflection or regular reflection. With this reflection member, the light can be guided to the outer peripheral portion of the emission surface more efficiently than in the first example.

In addition, as shown in (c) of FIG. 8, in the third example of the embodiment, an inclined surface is formed on at least a part of an outer peripheral portion of the diffusion plate 27b, and a diameter of the inclined surface increases from an incident surface side of the diffusion plate 27b where the light is incident from the optical member 29 toward an emission surface side opposite to the incident surface side. In addition, the inclined surface is formed into a flat surface. Thereby, the light reflected by the inclined surface is irradiated in the vicinity of the outer peripheral portion of the emission surface.

In addition, as shown in (d) of FIG. 8, the fourth example of the embodiment has a reflection surface having a shape along the inclined surface in addition to the configuration of the diffusion plate 27b shown in the third example. The fourth example is configured by a reflection member having the reflection surface. For example, the reflection member is configured to support a reflection sheet attached to the inclined surface by filling with a resin or the like. Moreover, the reflection mode may be diffuse reflection or regular reflection. With this reflection member, the light can be guided to the outer peripheral portion of the emission surface more efficiently than in the third example.

With the above configuration, the backlight device 100 according to Embodiment 5 can arbitrarily irradiate light on the vicinity of the outer peripheral portion of the emission surface and suppress a decrease in luminance at the outer peripheral portion.

Embodiment 6

Figure 9:
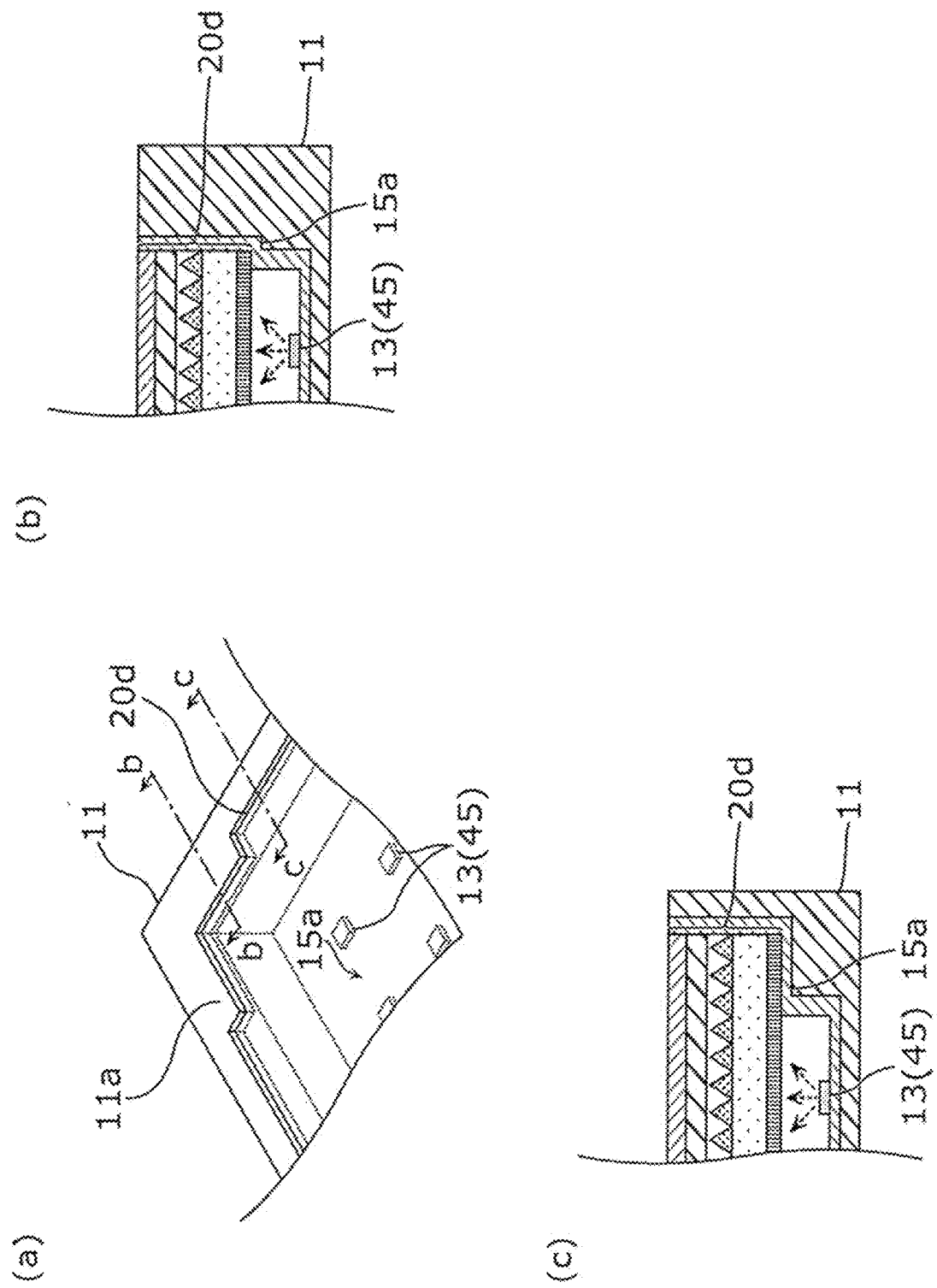
FIG. 9 is a diagram for illustrating a backlight device according to embodiment 6.

Next, Embodiment 6 is described using FIG. 9. FIG. 9 is a diagram for illustrating a backlight device according to Embodiment 6. (a) of FIG. 9 is a perspective view showing a corner of the backlight device 100 according to the embodiment. In addition, (b) of FIG. 9 is a cross-sectional view in which the backlight device 100 is cut along a b-b line shown in (a) of FIG. 9. In addition, (c) of FIG. 9 is a cross-sectional view in which the backlight device 100 is cut along a c-c line shown in (a) of FIG. 9.

Moreover, in (a) of FIG. 9, an optical unit 20d is simplified, and the light sources 45, the reflection sheet 15, and the like which can be seen through are shown.

The backlight device 100 in the embodiment has a configuration in which the step portion 43 at the corner is minimized. That is, in the embodiment, since an area where the optical unit 20d is in contact with the step portion 43 is small at the corner and a small amount of light is absorbed, and thus the light is not prone to be attenuated.

More specifically, the optical unit 20d including the optical member 29 and the diffusion plate 27 has a polygonal shape in which at least a part of the corner of the optical unit 20d is formed in a notch structure in a plan view. In addition, the step portion 43 has a protruding structure 11a corresponding to the notch-like structure formed at the corner of the optical unit 20d. Since the outer peripheral portion excluding the corner has the same configuration as the above-described embodiments, the optical unit 20d is fixed to the housing 11, and in the corner, the area in contact with the housing 11 and the fixing member 17 not shown decreases. Thus, absorption is suppressed at the corner where light attenuation due to the absorption is particularly remarkable. Thereby, the backlight device 100 having uniform luminance with suppressed absorption at the corners can be implemented. Thus, the liquid crystal display device 101 with high visibility can be implemented by the backlight device 100 having uniform luminance even at the corners.

Implementation Example

Figure 10:
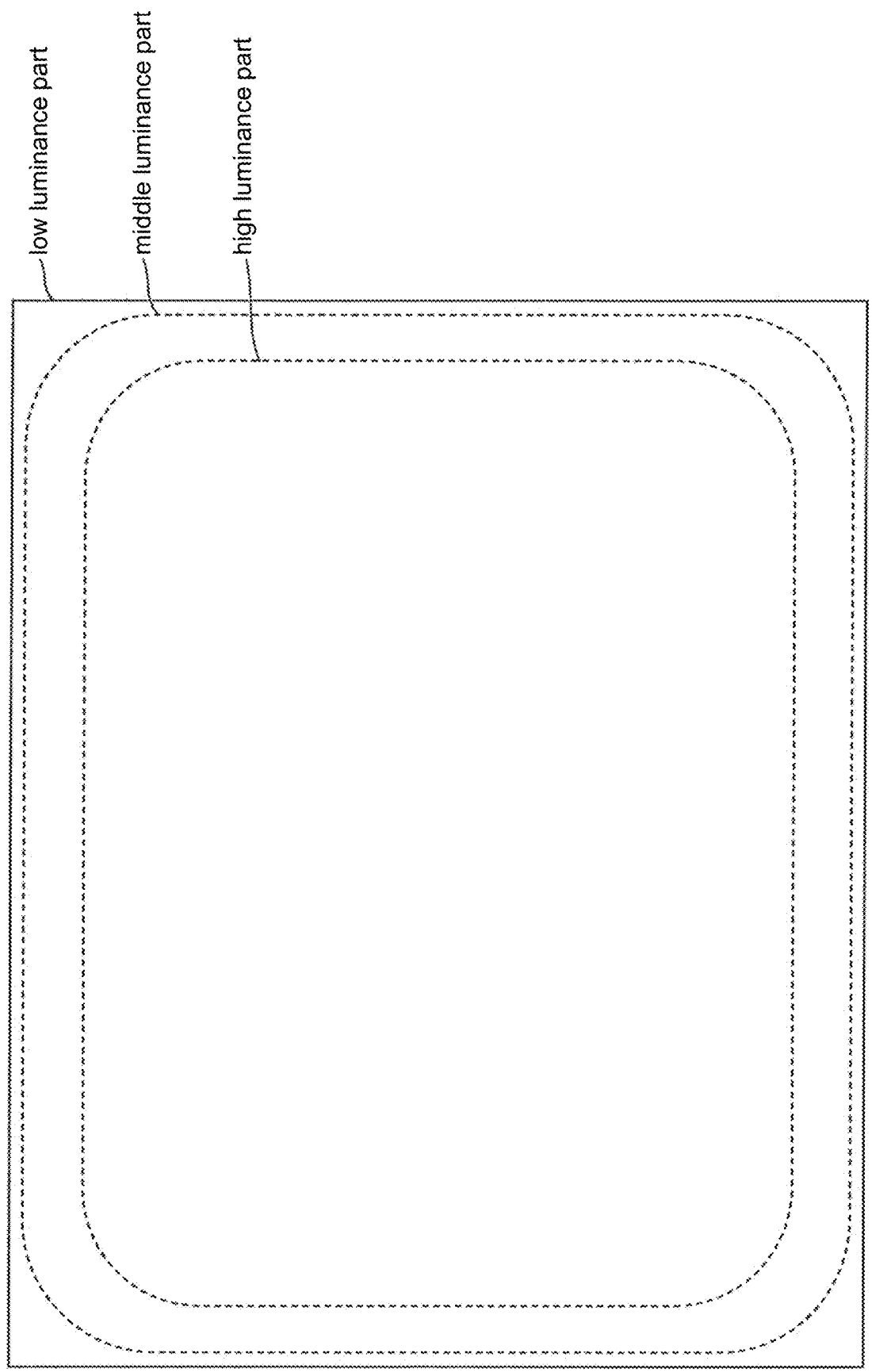
FIG. 10 is a conceptual diagram for illustrating a luminance distribution of a backlight device.
Figure 11:
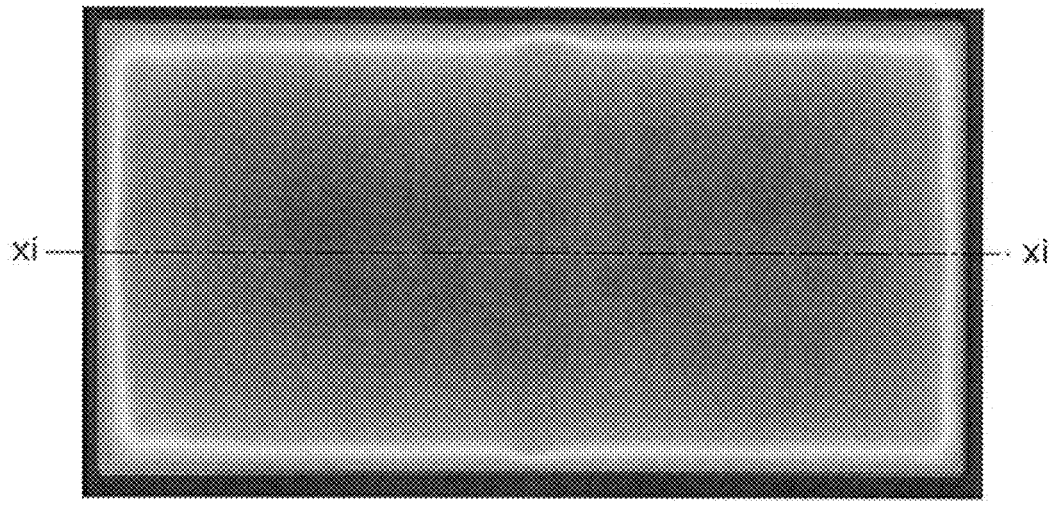
FIG. 11 is a diagram for illustrating luminance distributions of backlight devices according to a comparison example and an implementation example.
Figure 11:
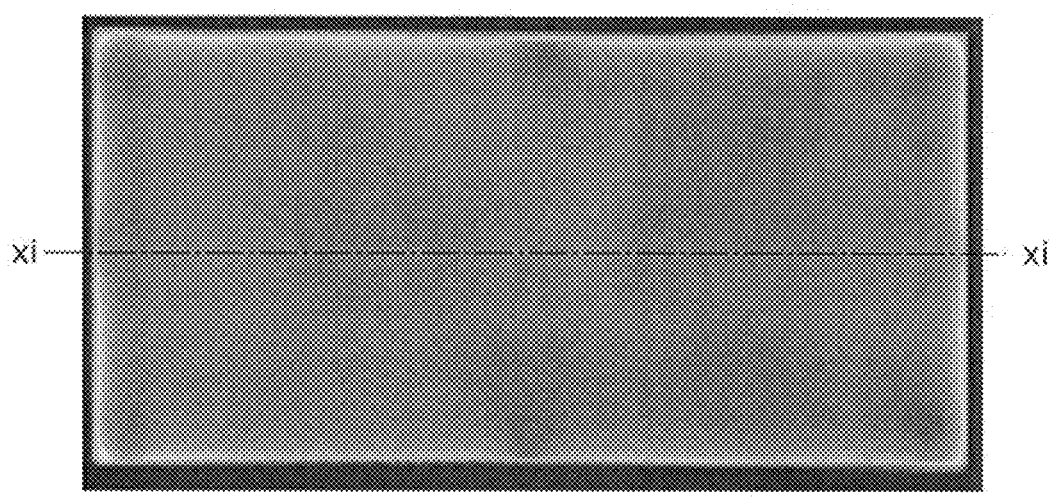

Furthermore, an implementation example is described below using FIG. 10 to FIG. 12. FIG. 10 is a conceptual diagram for illustrating a luminance distribution of a backlight device. In addition, FIG. 11 is a diagram for illustrating luminance distributions of backlight devices according to a comparison example and the implementation example. In addition, FIG. 12 is a diagram in which the luminance distributions along xi-xi lines shown in FIG. 11 are plotted on a two-dimensional surface.

As shown in FIG. 10, when the light emitted from the emission surface of the backlight device 100 is imaged by an imaging device, a luminance distribution is formed in a manner of a high luminance part, a middle luminance part, and a low luminance part from the central portion to the outer peripheral portion. A distribution map can be seen in which luminance decreases toward the outer peripheral portion due to presence of the housing 11 in the backlight device 100 and the inability to arrange the light source outside the outer peripheral portion.

(a) of FIG. 11 shows an actual luminance distribution of the backlight device according to the comparison example. (b) of FIG. 11 shows an actual luminance distribution of the backlight device according to the implementation example. As shown in (a) of FIG. 11, in the backlight device in the comparison example, a part of the housing 11 where light is not irradiated is black, and the emission surface is seen further inside. It can be known that a white place where luminance is low extends relatively inward in the diagram. On the other hand, as shown in (b) of FIG. 11, in the backlight device 100 in the implementation example, a part of the housing 11 where light is not irradiated is black, and the emission surface is seen further inside. It can be known that white places with low luminance remain in a very small part of the outer peripheral portion in the diagram.

Figure 12:
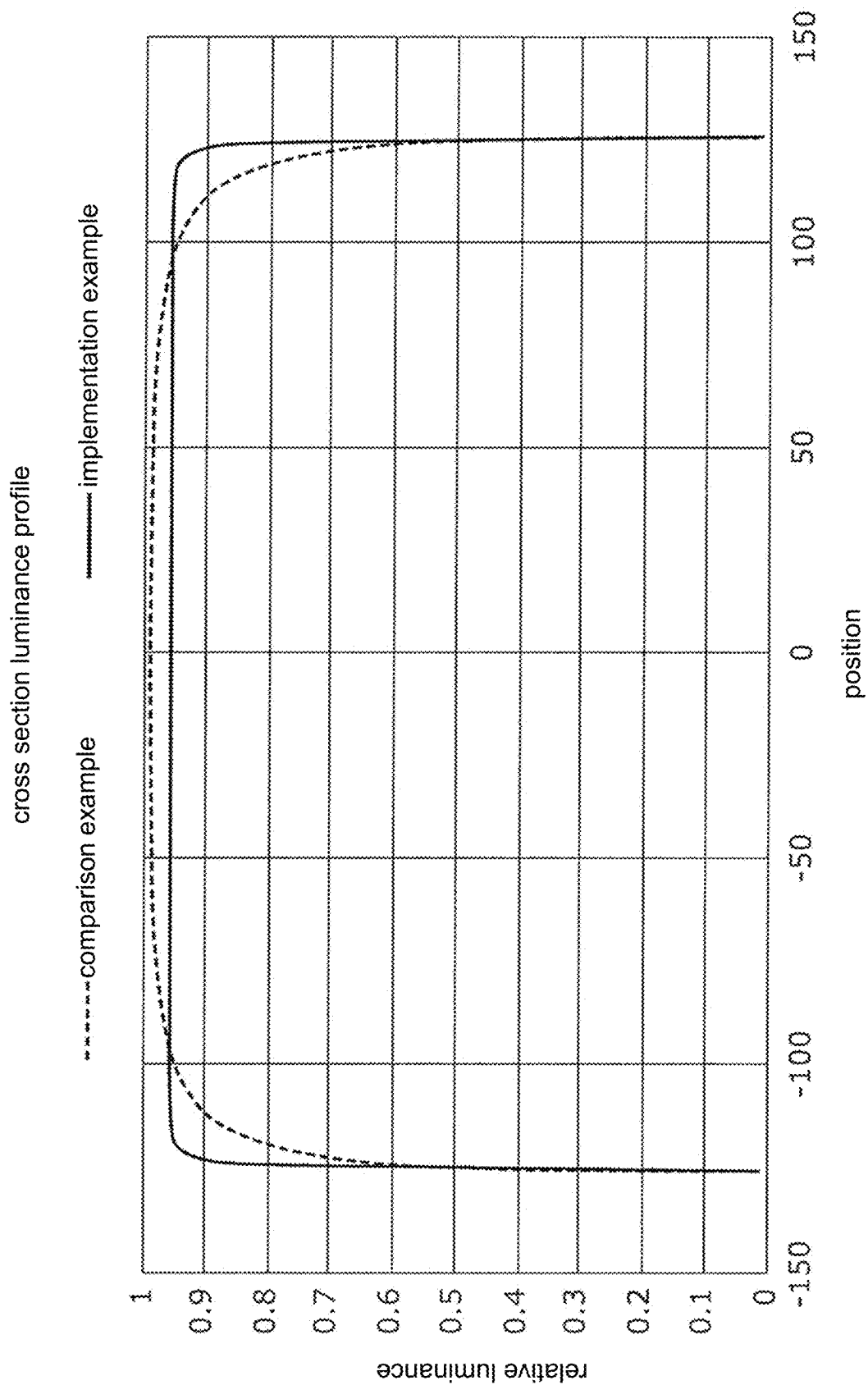
FIG. 12 is a diagram in which the luminance distributions along xi-xi lines shown in FIG. 11 are plotted on a two-dimensional surface.

As shown in FIG. 12, when the luminance is actually digitized and compared, it can be known that in the backlight device of the comparison example, the central portion has high luminance and the luminance decreases toward the outer peripheral portion. On the other hand, in the backlight device 100 in the implementation example, the luminance was lower in the central portion than that in the comparison example. However, a position where the luminance of the backlight device 100 in the implementation example becomes higher appears in the outer peripheral portion where the luminance is remarkably reduced in the backlight device in the comparison example. As shown in FIG. 12, the backlight device 100 in the implementation example is an ideal backlight device 100 which maintains uniform luminance from the center portion to the outer peripheral portion.

Other Embodiments

In the above, the backlight devices and the liquid crystal display devices according to the embodiments of the disclosure are illustrated, but the disclosure is not limited to the embodiments.

For example, in Embodiment 1, the Y-axis direction is exemplified as the predetermined direction. This is due to the shape when the optical member is divided into a plurality of second regions. That is, when two or more light sources which are adjacent to each other along the X-axis direction (the first direction) are combined as the second regions, a predetermined direction intersecting the Y-axis direction (the second direction) different from the X-axis direction is taken as, for example, the X-axis direction. This setting of the second regions may be appropriately selected according to the design, use and the like of the liquid crystal display device.

In addition, in Embodiments 1 to 3, the first regions are described as being directly above and near the light sources; however, the first regions are appropriately set according to the output light of the light sources, the distances between the light sources and the optical member, and the like. Positions on the optical member where the direct light can be sufficiently ignored with respect to the substantially uniform light resulted from multiple reflection may be set as the interface, and the inside set as the first regions and the outside set as the second regions.

In addition, the through holes are one example of the transmission portions. However, for example, instead of the transmission portions, optical members may be used which form reflection portions by reverse density plots and show the same transmittance distribution as a result.

In addition, the configuration is described in which the step portion is arranged in the housing to fix the optical unit. For example, a configuration may be employed in which the optical unit is supported from below by pins that rise from a bottom portion of the housing. In this case, the step portion 43 may not be formed. In addition, at that time, the reflection sheet may be disposed on the wall portion with which a side surface of the optical unit is in contact, and the light attenuation is greatly reduced.

Furthermore, the above embodiments and the above modification examples may be combined respectively.

INDUSTRIAL APPLICABILITY

The backlight device and the liquid crystal display device of the disclosure can be applied as, for example, a liquid crystal display having uniform luminance even in an end portion or the like.

What is claimed is:

1. A backlight device for irradiating a light to a back surface of a liquid crystal panel in a liquid crystal display device, comprising:
    a plurality of light sources;
    a substrate, wherein the plurality of light sources is mounted on a surface of the substrate;
    an optical member being plate-shaped which is disposed to face the surface of the substrate and through which a part of light emitted by the plurality of light sources is transmitted, wherein
    the optical member comprises:
    a first region corresponding to one light source among the plurality of light sources; and
    two or more second regions which are different from the first region and have an arrangement outline formed by combining two or more light sources adjacent to each other in a first direction among the plurality of light sources, wherein
    in the first region, a light transmittance increases as separating from a mounting position of the one light source, and
    in one second region among the two or more second regions, in places in contact with another second region adjacent in a second direction different from the first direction, a light transmittance increases as approaching an outer peripheral portion from a central portion of the optical member in a predetermined direction intersecting the second direction;
    a diffusion plate for diffusing the light transmitted through the optical member, wherein
    the diffusion plate has an inclined surface which is formed on at least a part of an outer peripheral portion of the diffusion plate, and a diameter of the inclined surface increases from a side of an incident surface of the diffusion plate where the light is incident from the optical member toward a side of an emission surface opposite to the incident surface; and
    a reflection member which has a reflection surface inclined along the inclined surface of the diffusion plate.

2. The backlight device according to claim 1, wherein
    each of the plurality of light sources is configured by a plurality of light emitting elements which is integrally driven for each light source, and
    in places where distances from the light sources or the light emitting elements are the same, it is determined that the light transmittance in corresponding third regions between adjacent light emitting elements within the first regions are smaller than the light transmittance in the second regions.

3. The backlight device according to claim 1, further comprising
 a housing which houses the plurality of light sources and the substrate and has an opening at a place facing the surface of the substrate, wherein
 a step portion to which the outer peripheral portion of the optical member is attached is arranged in the opening of the housing, and
 a step portion reflection surface which reflects the light is formed on at least a part of a surface of the step portion.

4. The backlight device according to claim 3, further comprising
 a fixing member being frame-shaped and configured to be in contact with the housing and fix the outer peripheral portion of the optical member to the step portion, wherein
 a fixing member reflection surface which reflects light is formed on at least a part of the surface of the fixing member to which the optical member is fixed.

5. The backlight device according to claim 1, wherein the inclined surface is formed into a convex surface.

6. The backlight device according to claim 1, wherein a plurality of transmission portions through which the light is transmitted is formed in the first region and the second regions of the optical member, and
 the light transmittance increases as an area of each of the transmission portions increases.

7. The backlight device according to claim 6, wherein the transmission portions are through holes penetrating the optical member in a direction perpendicular to a main surface of the optical member.

8. A liquid crystal display device, comprising
 the liquid crystal panel, and
 the backlight device according to claim 1 for irradiating the light to the back surface of the liquid crystal panel.

9. A backlight device for irradiating a light to a back surface of a liquid crystal panel in a liquid crystal display device, comprising:
 a plurality of light sources;
 a substrate, wherein the plurality of light sources is mounted on a surface of the substrate;
 an optical member being plate-shaped which is disposed to face the surface of the substrate and through which a part of light emitted by the plurality of light sources is transmitted, wherein
 the optical member comprises:
 a first region corresponding to one light source among the plurality of light sources; and
 two or more second regions which are different from the first region and have an arrangement outline formed by combining two or more light sources adjacent to each other in a first direction among the plurality of light sources, wherein
 in the first region, a light transmittance increases as separating from a mounting position of the one light source, and
 in one second region among the two or more second regions, in places in contact with another second region adjacent in a second direction different from the first direction, a light transmittance increases as approaching an outer peripheral portion from a central portion of the optical member in a predetermined direction intersecting the second direction;

a diffusion plate for diffusing the light transmitted through the optical member, wherein
 the diffusion plate has an inclined surface which is formed on at least a part of an outer peripheral portion of the diffusion plate, and a diameter of the inclined surface increases from a side of an incident surface of the diffusion plate where the light is incident from the optical member toward a side of an emission surface opposite to the incident surface; and
 an optical unit including the optical member and the diffusion plate has a polygonal shape in a plan view in which at least a part of each corner of the optical unit is formed into a notch-shaped structure, and
 the step portion has a protruding structure corresponding to the notch-shaped structure formed at least at a part of each corner of the optical unit.

10. The backlight device according to claim 9, wherein each of the plurality of light sources is configured by a plurality of light emitting elements which is integrally driven for each light source, and
 in places where distances from the light sources or the light emitting elements are the same, it is determined that the light transmittance in corresponding third regions between adjacent light emitting elements within the first regions are smaller than the light transmittance in the second regions.

11. The backlight device according to claim 9, further comprising
 a housing which houses the plurality of light sources and the substrate and has an opening at a place facing the surface of the substrate, wherein
 a step portion to which the outer peripheral portion of the optical member is attached is arranged in the opening of the housing, and
 a step portion reflection surface which reflects the light is formed on at least a part of a surface of the step portion.

12. The backlight device according to claim 11, further comprising
 a fixing member being frame-shaped and configured to be in contact with the housing and fix the outer peripheral portion of the optical member to the step portion, wherein
 a fixing member reflection surface which reflects light is formed on at least a part of the surface of the fixing member to which the optical member is fixed.

13. The backlight device according to claim 9, wherein the inclined surface is formed into a convex surface.

14. The backlight device according to claim 9, wherein a plurality of transmission portions through which the light is transmitted is formed in the first region and the second regions of the optical member, and
 the light transmittance increases as an area of each of the transmission portions increases.

15. The backlight device according to claim 14, wherein the transmission portions are through holes penetrating the optical member in a direction perpendicular to a main surface of the optical member.

16. A liquid crystal display device, comprising
 the liquid crystal panel, and
 the backlight device according to claim 9 for irradiating the light to the back surface of the liquid crystal panel.

* * * * *